US011230969B2

(12) United States Patent
Bellinger et al.

(10) Patent No.: US 11,230,969 B2
(45) Date of Patent: Jan. 25, 2022

(54) SYSTEM AND METHOD FOR OPTIMIZING THE INTEGRATION OF ENGINES AND VEHICLE DRIVELINE RETARDERS

(71) Applicant: Cummins Inc., Columbus, IN (US)

(72) Inventors: Steven M. Bellinger, Columbus, IN (US); Richard D. Mason, Hope, IN (US)

(73) Assignee: Cummins Inc., Columbus, IN (US)

( * ) Notice: Subject to any disclaimer, the term of this patent is extended or adjusted under 35 U.S.C. 154(b) by 243 days.

(21) Appl. No.: 15/304,007

(22) PCT Filed: Apr. 29, 2015

(86) PCT No.: PCT/US2015/028332
§ 371 (c)(1),
(2) Date: Oct. 13, 2016

(87) PCT Pub. No.: WO2015/168313
PCT Pub. Date: Nov. 5, 2015

(65) Prior Publication Data
US 2017/0037777 A1    Feb. 9, 2017

Related U.S. Application Data

(60) Provisional application No. 61/986,721, filed on Apr. 30, 2014.

(51) Int. Cl.
*F02B 67/08* (2006.01)
*F01P 3/20* (2006.01)
(Continued)

(52) U.S. Cl.
CPC ............ *F02B 67/08* (2013.01); *F01P 3/20* (2013.01); *F01P 7/14* (2013.01); *B60T 1/087* (2013.01);
(Continued)

(58) Field of Classification Search
CPC . F01M 1/02; F01P 2060/06; F01P 7/16; F01P 7/167; F01P 2003/001; B60T 1/087;
(Continued)

(56) References Cited

U.S. PATENT DOCUMENTS 4,430,966 A    2/1984  Marandet et al.
4,836,341 A    6/1989  Hall, III
(Continued)

FOREIGN PATENT DOCUMENTS

DE    0873925 A2 * 10/1998  .............. B60T 1/087
DE    0873926 B1 *  6/2003  .............. B60T 1/087
(Continued)

OTHER PUBLICATIONS

Supplementary Search Report from corresponding EP Application No. 15786092.5, dated Nov. 6, 2017, pp. 1-9.
(Continued)

*Primary Examiner* — Logan M Kraft
*Assistant Examiner* — Joshua Campbell
(74) *Attorney, Agent, or Firm* — Foley & Lardner LLP (57) ABSTRACT

A coolant diverter system and method of controlling coolant flow are provided. The coolant diverter system includes a coolant diverter body having a coolant inlet opening, a driveline retarder outlet opening and a bypass outlet opening. The coolant diverter system also includes a valve positioned in the coolant diverter body. The valve is configured in a first valve orientation to fluidly couple the coolant inlet opening to the driveline retarder outlet opening in isolation from the bypass outlet opening. The valve is configured in a second valve orientation to fluidly couple the coolant inlet opening to the driveline retarder outlet opening and the bypass outlet opening. The coolant diverter system also includes a valve controller configured to place the valve in the first valve orientation in response to activation of a
(Continued)

driveline retarder coupled to the driveline retarder outlet opening for braking.

23 Claims, 7 Drawing Sheets (51) Int. Cl.
| | |
|---|---|
| F01P 7/14 | (2006.01) |
| B60T 10/02 | (2006.01) |
| B60T 1/093 | (2006.01) |
| B60T 1/087 | (2006.01) |
| B60T 13/58 | (2006.01) |
| F16D 65/78 | (2006.01) |
| F01P 3/00 | (2006.01) |

(52) U.S. Cl.
CPC .............. *B60T 1/093* (2013.01); *B60T 10/02* (2013.01); *B60T 13/585* (2013.01); *F01P 2003/001* (2013.01); *F01P 2007/146* (2013.01); *F01P 2060/06* (2013.01); *F16D 65/78* (2013.01)

(58) Field of Classification Search
CPC ........ B60T 1/093; B60T 13/585; B60T 10/02; F16D 65/78
USPC .......................................... 123/319
See application file for complete search history.

(56) References Cited

U.S. PATENT DOCUMENTS

| | | | | | |
|---|---|---|---|---|---|
| 5,101,941 | A | * | 4/1992 | Long .................. | B60T 1/087 188/274 |
| 5,372,098 | A | * | 12/1994 | Borsboom ............... | F01P 3/20 123/41.01 |
| 5,836,269 | A | * | 11/1998 | Schneider .............. | F01P 11/029 123/41.1 |
| 5,996,762 | A | * | 12/1999 | Edelmann .............. | B60K 11/02 123/41.31 |
| 6,202,783 | B1 | * | 3/2001 | Taylor .................. | B60T 1/093 180/305 |
| 7,182,049 | B2 | | 2/2007 | Wikstrom | |
| 2002/0148416 | A1 | * | 10/2002 | Cohen ................. | F01P 7/16 123/41.1 |
| 2004/0035194 | A1 | * | 2/2004 | Wakahara .............. | F01P 11/16 73/114.71 |
| 2007/0102251 | A1 | | 5/2007 | Laukemann | |
| 2007/0131181 | A1 | | 6/2007 | Vogelsang | |
| 2008/0267317 | A1 | | 10/2008 | Malladi | |
| 2013/0255603 | A1 | * | 10/2013 | Pursifull ................ | F01P 11/16 123/41.15 |
| 2014/0083376 | A1 | * | 3/2014 | Bohm .................... | F01P 7/165 123/41.1 |

FOREIGN PATENT DOCUMENTS

| | | | | |
|---|---|---|---|---|
| DE | 10 2004 061 428 | | 12/2004 | |
| DE | WO 2008043425 A1 | * | 4/2008 | ................ B60T 5/00 |
| DE | 102011104265 A1 | * | 4/2012 | ................ F01P 7/16 |
| EP | 0 873 926 A2 | | 10/1998 | |
| EP | 0873925 A2 | * | 10/1998 | ............. B60T 10/02 |
| EP | 0873926 B1 | * | 6/2003 | ............. B60T 1/087 |
| EP | 2 039 903 | | 9/2008 | |
| EP | 2 213 857 | | 8/2009 | |
| EP | 2 587 017 | | 7/2012 | |
| JP | 62200040 A | * | 9/1987 | |
| JP | 2529372 Y2 | * | 3/1997 | |
| WO | WO-2005/014985 | | 2/2005 | |
| WO | WO-2006/066711 | | 6/2006 | |
| WO | WO-2007/003303 | | 1/2007 | |
| WO | WO-2008043425 A1 | * | 4/2008 | ............. B60T 10/02 |
| WO | WO-2008/080872 | | 7/2008 | |

OTHER PUBLICATIONS

International Search Report and Written Opinion of the International Searching Authority issued in PCT/US2015/028332, dated Jul. 22, 2015.

Office Action from corresponding CN Application No. 201580021085.4, dated Aug. 5, 2019, pp. 1-14.

\* cited by examiner

SYSTEM AND METHOD FOR OPTIMIZING THE INTEGRATION OF ENGINES AND VEHICLE DRIVELINE RETARDERS

CROSS REFERENCE TO RELATED APPLICATIONS

This application is a U.S. National Stage Application of PCT Application No. PCT/US2015/028332, filed Apr. 29, 2015, which claims the benefit of and priority to U.S. Provisional Patent Application No. 61/986,721, filed Apr. 30, 2014, entitled "SYSTEM AND METHOD FOR OPTIMIZING THE INTEGRATION OF ENGINES AND VEHICLE DRIVELINE RETARDERS," and the disclosures of which are incorporated herein by reference in their entirety.

TECHNICAL FIELD

This disclosure relates to a system for cooling a driveline retarder coupled to an internal combustion engine.

BACKGROUND

Vehicles propelled by internal combustion engines generally include cooling systems having an external circuit that allows engine coolant to flow through a vehicle radiator to manage the heat loads of the engine. Certain vehicles, such as large or heavy duty vehicles are fitted with driveline retarders. The driveline retarder is used to assist with braking and slowing the vehicle and in this implementation produce a significant amount of heat. The driveline retarder typically includes a heat exchanger to dissipate the heat generated during operation and thereby maintain the driveline retarder at a safe operating temperature. Vehicles equipped with a driveline retarder generally include a coolant circuit where the engine coolant is routed through the heat exchanger of the driveline retarder and then on to the vehicle radiator and internal combustion engine. While this coolant circuit may dissipate the coolant heat loads of the engine and of the driveline retarder, the added restriction of the driveline retarder heat exchanger and negatively impacts the cooling capability of the vehicle. While water pump speeds may be increased to compensate for the increased coolant system restrictions, increased water pump speeds lead to increased water pump parasitics that result in reduced engine efficiency.

SUMMARY

Various embodiments provide systems and methods of controlling coolant flow. Various embodiments provide a coolant diverter system that includes a coolant diverter body having a coolant inlet opening, a driveline retarder outlet opening and a bypass outlet opening. The coolant diverter system also includes a valve positioned in the coolant diverter body. The valve is configured in a first valve orientation to fluidly couple the coolant inlet opening to the driveline retarder outlet opening in isolation from the bypass outlet opening. The valve is configured in a second valve orientation to fluidly couple the coolant inlet opening to the driveline retarder outlet opening and the bypass outlet opening. The coolant diverter system also includes a valve controller configured to place the valve in the first valve orientation in response to activation of a driveline retarder coupled to the driveline retarder outlet opening for braking.

In particular embodiments, the valve controller is further configured to place the valve in the second valve orientation in response to deactivation of the driveline retarder. The valve controller may be further configured to place the valve in the second valve orientation in response to deactivation of the driveline retarder and in response to a temperature in the driveline retarder being below a predetermined threshold. In particular embodiments, the valve controller is further configured to place the valve in the first valve orientation in response to an indication of a temperature in a driveline retarder coupled to the retarder outlet opening being above a predetermined threshold and to place the valve in the second valve orientation in response to the temperature in the driveline retarder being below the predetermined threshold. The diverter body further includes a retarder inlet opening fluidly coupled to the bypass outlet opening, in accordance with particular embodiments. The diverter body further includes a coolant outlet opening, in accordance with particular embodiment. The valve may include a pop-valve. The valve may include a throttle-valve. In particular embodiments, the valve is configured to in a third valve orientation fluidly couple the coolant inlet opening to the bypass outlet opening in isolation from the retarder outlet opening.

Various embodiments provide a valve control system that includes a driveline retarder condition module configured to generate an activation signal in response to activation of a driveline retarder. The system also includes a valve control module coupled to the driveline retarder condition module. The valve control module is configured to generate a first valve control command in response to receipt of the activation command. The first valve control command is configured to cause a valve positioned in a valve diverter body to move to a first valve orientation fluidly coupling a coolant inlet opening in the valve diverter body to a driveline retarder outlet opening in the valve diverter body in isolation from the bypass outlet opening. The valve moves to the first valve orientation from a second valve orientation. The second valve orientation fluidly couples the coolant inlet opening to the driveline retarder outlet opening and a bypass outlet opening in the valve diverter body.

Various embodiments provide a valve control system that includes a driveline retarder condition module and a valve control module coupled to the driveline retarder condition module. The driveline retarder condition module is structured to determine that a driveline retarder in a vehicle is in one of an activated state and a deactivated state responsive to at least one of received temperature data and vehicle operation data, the temperature data indicative of a temperature of the driveline retarder and the vehicle operation data indicative of an operating condition of the vehicle. The valve control module is structured to generate one of a first valve control command and a second valve control command responsive to a determined state of the driveline retarder. The first valve control command is generated in response to a determined activated state. The first valve control command is configured to cause a valve positioned in a valve diverter body to move to a first valve orientation fluidly coupling a coolant inlet opening in the valve diverter body to a driveline retarder outlet opening in the valve diverter body in isolation from the bypass outlet opening. The second valve control command is generated in response to a determined deactivated state. The second valve command is configured to cause the valve to move to a second valve orientation, the second valve orientation fluidly coupling the coolant inlet opening to the driveline retarder outlet opening and a bypass outlet opening in the valve diverter body.

Various embodiments provide a method of controlling coolant flow to a driveline retarder. The method includes determining activation of a driveline retarder. The method also includes causing a valve positioned in a coolant diverter body to move to a first valve orientation fluidly coupling a coolant inlet opening in the valve diverter body to a driveline retarder outlet opening in the valve diverter body in isolation from the bypass outlet opening in response to activation of the driveline retarder. The valve moves to the first valve orientation from a second valve orientation. The second valve orientation fluidly couples the coolant inlet opening to the driveline retarder outlet opening and a bypass outlet opening in the valve diverter body.

Various embodiments provide an engine system that includes an internal combustion engine including a driveline component. The engine system also includes a driveline retarder coupled to the driveline component for applying braking force to the driveline component. The engine system includes a coolant circulation system coupled to the internal combustion engine. The engine system includes a coolant diverter body fluidly coupling the coolant circulation system to the driveline retarder. The coolant diverter body has a coolant inlet opening in fluid communication with the coolant circulation system, a driveline retarder outlet opening in fluid communication with a coolant inlet opening, a bypass passage outlet opening in fluid communication with the coolant inlet opening, and a coolant outlet opening in fluid communication with a driveline retarder coolant inlet opening the bypass passage outlet opening, and the coolant circulation system. The engine system also includes a valve positioned in the diverter body. The valve is configured in a first valve orientation to fluidly isolate the bypass passage outlet opening from the coolant inlet opening. The valve is further configured to in a second valve orientation to fluidly couple the coolant inlet opening to the driveline retarder outlet opening and the bypass passage outlet opening. The engine system also includes a valve controller configured to move the valve from the second valve orientation to the first valve orientation in response to activation of a driveline retarder coupled to the driveline retarder outlet opening for braking.

Further embodiments provide a coolant diverter system. The system includes a coolant diverter body having a coolant inlet opening, a driveline retarder outlet opening and a bypass outlet opening. A valve is positioned in the coolant diverter body. The valve is configured, in a first valve orientation, to fluidly couple the coolant inlet opening to the driveline retarder outlet opening in isolation from the bypass outlet opening. The valve is configured, in a second valve orientation, to fluidly couple the coolant inlet opening to the driveline retarder outlet opening and the bypass outlet opening. A valve controller is configured to receive operation data regarding the driveline retarder and selectively place the valve in one of the first and second valve orientations responsive to the operation data.

Still further embodiments also provide a method of controlling coolant flow to a driveline retarder. The method includes receiving operation data regarding a driveline retarder. The method further includes causing a valve positioned in a coolant diverter body to move to a first valve orientation fluidly coupling a coolant inlet opening in the valve diverter body to a driveline retarder outlet opening in the valve diverter body in isolation from the bypass outlet opening in response to the operation data, the valve moving to the first valve orientation from a second valve orientation, the second valve orientation fluidly coupling the coolant inlet opening to the driveline retarder outlet opening and a bypass outlet opening in the valve diverter body.

The inventors have appreciated that coolant flow through driveline retarders may be dynamically controlled as a function of vehicle operating conditions to maintain the operating efficiency of the cooling system and the vehicle. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, and methods of controlling coolant flow. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
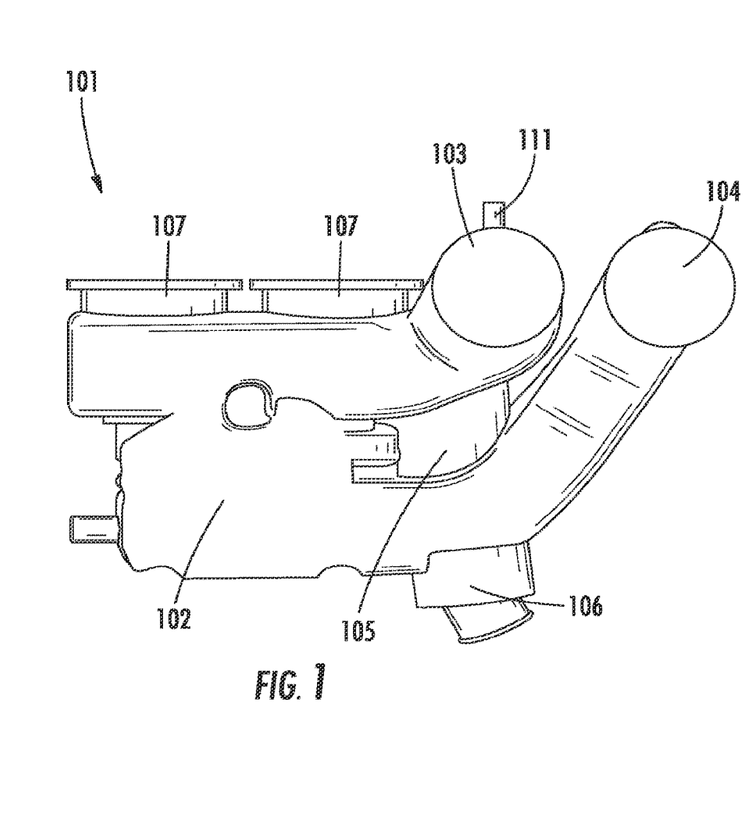
FIG. 1 shows a front view of a coolant diverter for a vehicle having an internal combustion engine coupled to a driveline retarder, in accordance with example embodiments.

FIG. 1 shows a front view of a coolant diverter for a vehicle having an internal combustion engine coupled to a driveline retarder, in accordance with example embodiments. Many on-road and off-road vehicles include auxiliary or secondary braking units, known as driveline retarders. Driveline retarders may be mounted in a variety of locations (e.g., the gearbox, in the driveline, etc.) and function to apply a retarding or braking force to the vehicle (e.g., via eddy currents in an electric retarder, via movement of a fluid in for example a hydraulic retarder, etc.). Advantageously, driveline retarders not only provide a back-up source of braking force but also may not rely upon the conventional braking system in the vehicle. In this regard, activation of the driveline retarder may not cause additional use from the conventional braking system thereby having little to no adverse effect (e.g., wear and tear from friction) on the conventional braking system. Due to the power dissipation via the braking from the driveline retarder, the driveline retarder can be a significant heat sink for the dissipated heat. Accordingly, a heat exchanger fluidly may be coupled to the driveline retarder for removing the heat from the driveline retarder. However, directing coolant to the heat exchanger of the driveline retarder is an energy consumptive technique that reduces operational efficiency of the engine and vehicle (e.g., reduces the flow of coolant to other locations of the engine system, etc.). According to the present disclosure, the systems and methods described herein relate to a coolant diverter and operation thereof that work to control coolant flow as a function of operating conditions of the vehicle. Such systems and methods facilitate the maintenance of the cooling capability of the vehicle without or little impact to the operating efficiency of the engine or its cooling capability. These and other features are described more fully herein.

As shown in FIG. 1, the coolant diverter includes a coolant diverter body 101, which in example embodiments may be in the form of a housing or conduit network. The coolant diverter body 101 acts as a manifold connecting and directing the flow of coolant from a radiator coolant circuit to a driveline retarder and back to the radiator coolant circuit. The coolant diverter body 101 includes a coolant inlet opening 102 configured to receive coolant from an engine component such as a cylinder head of the engine, for example pursuant to coolant being transferred from a water pump, through a cylinder block and into the cylinder head. The coolant from the engine is pumped into the coolant diverter body 101 via coolant inlet opening 102 for transfer of that coolant to a driveline retarder connected to the coolant diverter body 101. The coolant inlet opening 102 is in fluid communication with a driveline retarder outlet opening 104 configured to supply coolant from the coolant diverter body to the driveline retarder. Coolant flowing into the coolant diverter body 101 through the coolant inlet opening 102 may flow out of the coolant diverter body 101 via the driveline retarder outlet opening 104 and to a driveline retarder via a driveline retarder coolant supply line connected to driveline retarder outlet opening 104. The coolant flowing out of the coolant diverter body via driveline retarder outlet opening 104 flows into a driveline retarder heat exchanger to absorb heat from the driveline retarder. The driveline retarder may include, but is not limited to, a hydraulic driveline retarder and an electric driveline retarder. When the driveline retarder is activated, for example, for assisting in a braking function to slow a vehicle down, the driveline retarder generates a significant amount of heat which must be dissipated. The heat dissipated from the driveline retarder and absorbed by the coolant from the heat exchanger of the driveline retarder cools the temperature of the driveline retarder during and/or after activation of the driveline retarder for braking. Once the coolant has absorbed heat from the driveline retarder via the driveline retarder heat exchanger, the coolant is then returned to the coolant diverter body 101 from the driveline retarder heat exchanger via a driveline retarder inlet opening 103. The heated coolant returned to the coolant diverter body 101 via the driveline retarder inlet opening 103 is returned to the radiator for cooling via one or more coolant outlet openings 107. In particular embodiments, one or more thermostat valves may be positioned in coolant diverter body 101 to permit flow of heated coolant out of the coolant diverter body 101 via coolant outlet openings 107 and to a radiator for cooling. If, for example, the coolant has not reached a certain temperature the one or more thermostat valves may prevent the coolant from flowing out of coolant outlet openings 107 and to a radiator fed by the coolant outlet openings 107.

The coolant diverter body 101 also includes a bypass passage 105 that fluidly couples the coolant inlet opening 102 to the coolant outlet openings 107. The bypass passage 105 is positioned between the driveline retarder outlet opening 104, supplying coolant to the driveline retarder, and the driveline retarder inlet opening 103, receiving coolant from the driveline retarder. The bypass passage 105 permits at least a portion of the coolant flowing into the coolant diverter body 101 to bypass the driveline retarder and flow back out of the coolant diverter body 101 via the coolant outlet openings 107. The coolant flowing back out of the coolant diverter body 101 via the coolant outlet openings 107 goes to the radiator. Accordingly, when additional cooling is not required by the driveline retarder, the coolant diverter body passively permits at least some of the coolant to bypass the driveline retarder heat exchanger. The bypass passage 105 includes a valve 106 disposed within the bypass passage 105. In particular embodiments, the valve 106 may be positioned at the intersection of the bypass passage 105 (e.g. at the mouth of the bypass passage 105) and the passage leading from the coolant inlet opening 102 to the driveline retarder outlet opening 104. The valve 106 impacts the quantity of flow entering the coolant inlet opening 102 that bypasses the driveline retarder outlet opening 104 and hence bypasses the driveline retarder heat exchanger. More specifically, in particular embodiments the valve 106 may be completely closed, for example during the activation of the driveline retarder, so that coolant cannot flow through or is isolated from the bypass passage 105. Accordingly in the closed orientation, valve 106 causes substantially all of the coolant entering the coolant diverter body 101 to flow to the driveline retarder via the driveline retarder outlet opening 104 for maximum cooling and heat dissipation from the driveline retarder heat exchanger of the driveline retarder. When the valve 106 is in the open orientation, valve 106 allows both the bypass passage 105 and the driveline retarder outlet opening 104 to be in fluid communication with the coolant inlet opening 102. Fluid communication between the coolant inlet opening and both the driveline retarder outlet opening 104 and the bypass passage 105 permits the coolant to flow to the driveline retarder heat exchanger or to optionally passively bypass the driveline retarder heat exchanger. The passive bypass may depend on the restriction conditions within the driveline retarder heat exchanger flow circuit. In example embodiments, the bypass passage 105 may have a cross section with respect to the area of the driveline retarder outlet opening 104 that causes a particular level of flow balancing when the valve 106 is in the open orientation. For example, the driveline retarder heat exchanger flow circuit may have a smaller cross sectional area providing a naturally more restrictive flow path than the bypass passage 105. As discussed further herein, the orientation of the valve 106 is controlled via a valve controller in response to certain events or conditions related to operation of the driveline retarder.

In particular embodiments, the coolant diverter body 101 includes a vent 111 positioned in the driveline retarder inlet opening 103. The coolant diverter body 101 may also include a second vent (not shown) positioned in the driveline retarder outlet opening 104, in accordance with particular embodiments. A vent in the driveline retarder inlet and outlet (or supply and return) may be fluidly coupled with one another via a channel extending between the driveline retarder supply and return lines. Accordingly, when coolant is introduced into the coolant circuit, air that may be contained in the coolant circuit may be expelled from the coolant circuit.

Figure 2:
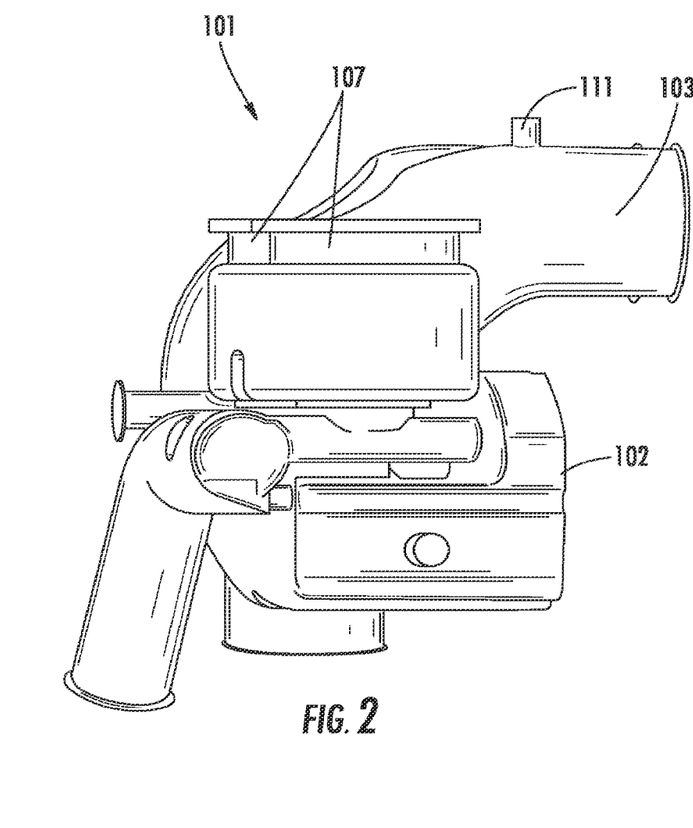
FIG. 2 illustrates a side view of the coolant diverter of FIG. 1.

FIG. 2 illustrates a side view of the coolant diverter of FIG. 1. As shown in FIG. 2, the coolant diverter body 101 may include a plurality of conduits extending from the coolant diverter body 101 to the driveline retarder to place the driveline retarder outlet opening 104 and the driveline retarder inlet opening 103 in fluid communication with the driveline retarder heat exchanger. The coolant diverter body 101 may also include flanged openings at the coolant inlet opening 102 and the coolant outlet openings 107.

Figure 3:
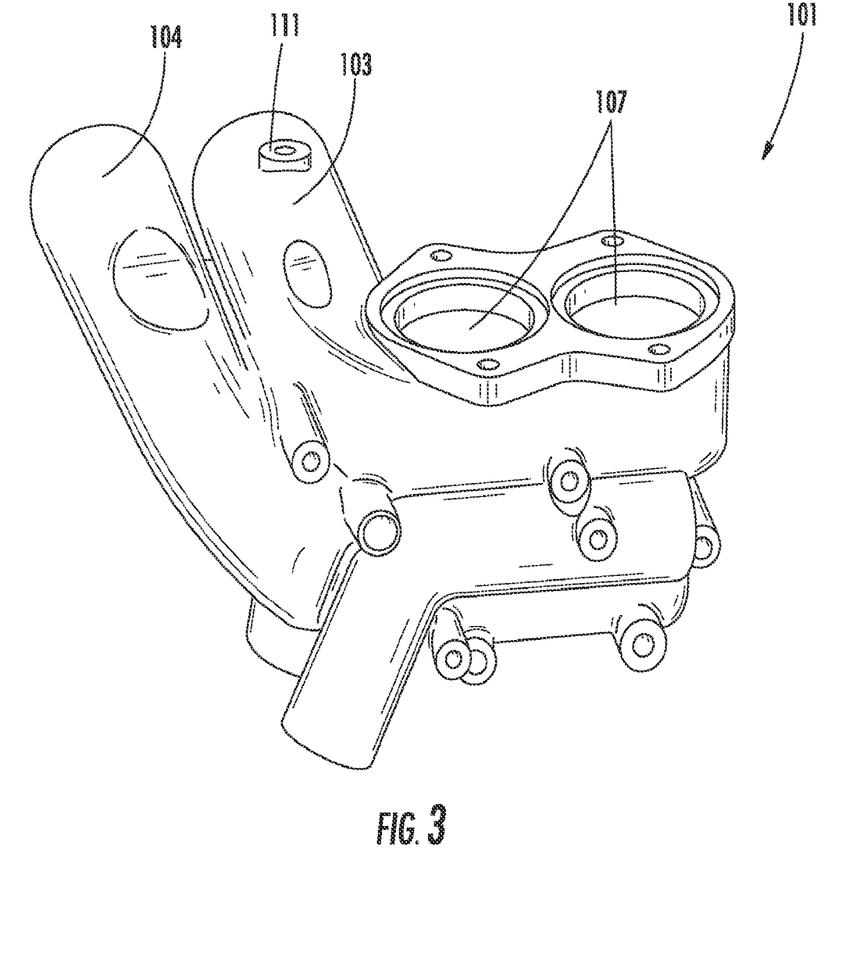
FIG. 3 illustrates a rear perspective view of the coolant diverter of FIG. 1.

FIG. 3 illustrates a rear perspective view of the coolant diverter of FIG. 1. As shown in FIG. 3, the coolant outlet openings 107 may include a two passage opening feeding the radiator. In particular embodiments, a thermostat may be housed in each passage. The coolant diverter body 101 may be composed of a variety of materials including but not limited to iron, steel, aluminum, or other non-metallic materials capable of withstanding the high temperature of the heated coolant. While the coolant diverter body 101 illustrated in FIGS. 1-3 generally includes the coolant inlet opening 102, the driveline retarder outlet opening 104, the driveline retarder inlet opening 103, the coolant outlet openings 107, the bypass passage 105, and the valve 106, the diverter body 101 may include fewer parts, in accordance with example embodiments. For example, the diverter body may be formed in a T configuration and may include a coolant inlet opening, a driveline retarder outlet opening, a bypass outlet opening of a bypass passage, and a valve, in accordance with example embodiments. In such an embodiment, the driveline retarder inlet opening and the coolant outlet opening may be a separate or distinct component configured for coupling to the diverter body at the bypass passage to feed coolant from the bypass passage and from the driveline retarder return to the radiator.

Figure 4:
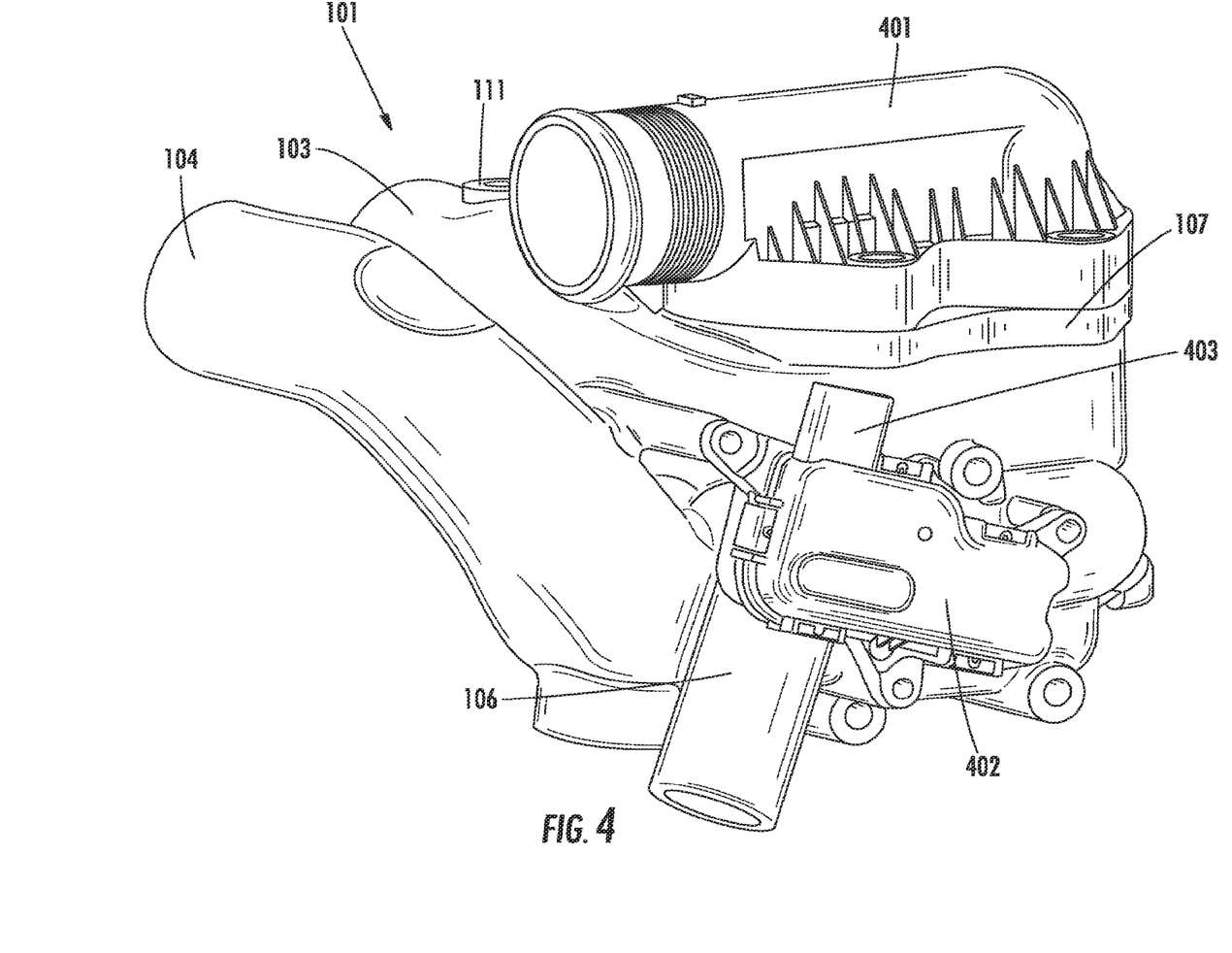
FIG. 4 shows a coolant diverter including a valve controller, in accordance with example embodiments.

FIG. 4 shows a coolant diverter system including a valve controller in accordance with example embodiments. The coolant diverter body 101 is illustrated coupled to a radiator connector 401 configured to couple a conduit extending from the radiator to the coolant outlet openings 107 of the coolant diverter body 101. The coolant diverter body 101 also includes a valve controller 402, coupled to the valve 106 disposed at or in the bypass passage 105. The valve controller 402 may be electrically coupled to a power source and/or other sensors, controllers, or control modules such as an engine control unit, a temperature sensor, or other electrical components via electrical connector 403. The valve controller 402 is configured to actuate the valve 106 to move valve 106 between the orientations discussed herein. Specifically, the valve controller 402 is configured to move the valve 106 to a first open orientation where valve 106 allows both the bypass passage 105 and the driveline retarder outlet opening 104 to be in fluid communication with the coolant inlet opening 102. The valve controller 402 is further configured to move the valve 106 to a first closed orientation where valve 106 causes substantially all of the coolant entering the coolant diverter body 101 to flow to the driveline retarder via the driveline retarder outlet opening 104 and isolates or prevents coolant from flowing through the bypass passage 105. If the valve is located in the bypass passage 105, coolant may flow partially into the bypass passage 105, but will be prevented from flowing through the bypass passage (i.e. out of the passage and to the coolant outlet openings 107). When the valve is in the first closed orientation coolant directed to the driveline retarder via the driveline retarder outlet opening 104 flows to the radiator after flowing through the driveline retarder heat exchanger and flowing back to the coolant diverter body 101 via the driveline retarder inlet opening 103 in fluid communication with the coolant outlet openings 107.

Figure 5A:
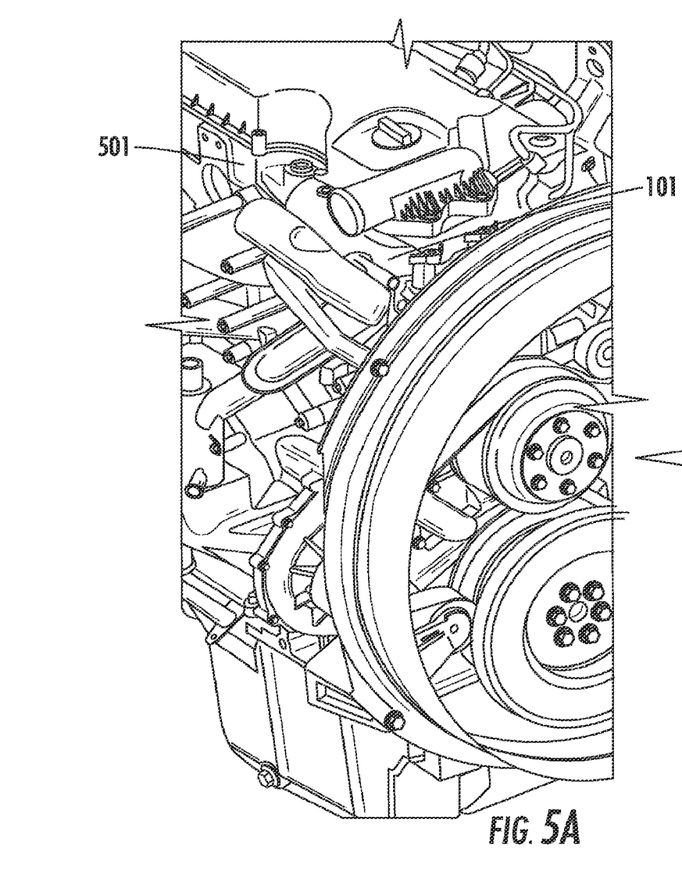
FIGS. 5A and 5B illustrate the coolant diverter of FIG. 4 coupled to an engine, in accordance with example embodiments.
Figure 5B:
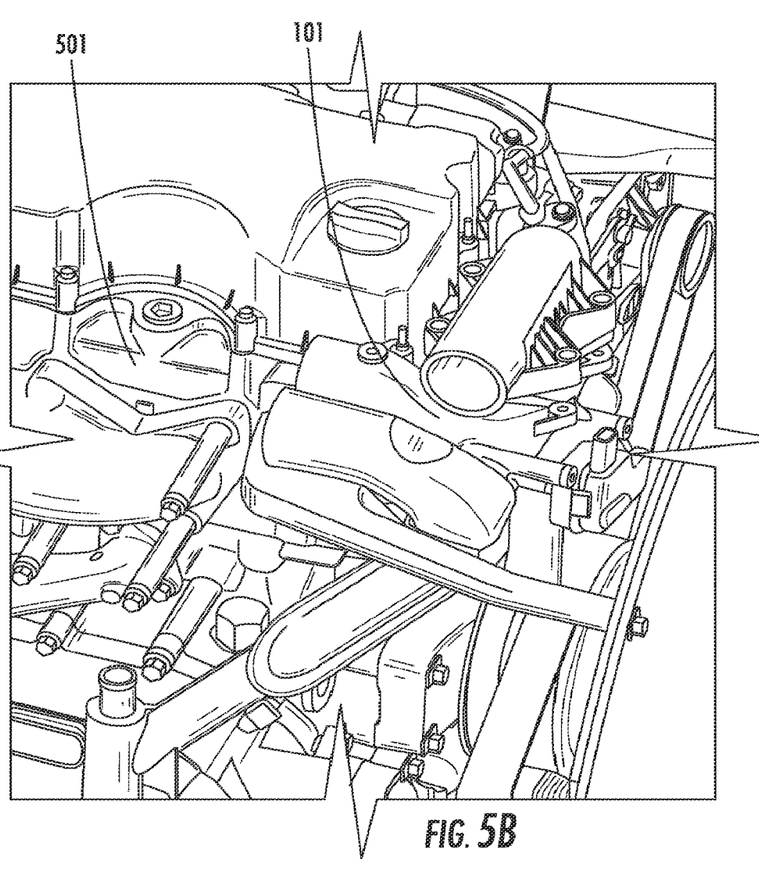

FIGS. 5A and 5B illustrate the coolant diverter of FIG. 4 coupled to an engine in accordance with example embodiments. As shown in FIGS. 5A and 5B, the coolant diverter body 101 is configured for compact integration with internal combustion engine 501, which may include a diesel or gasoline engine, to control the fluid communication between a radiator of the engine 501 and a driveline retarder mechanically coupled to driveline components of the internal combustion engine 501. The driveline components transmit power to the wheels of a vehicle coupled to internal combustion engine 501.

Figure 6A:
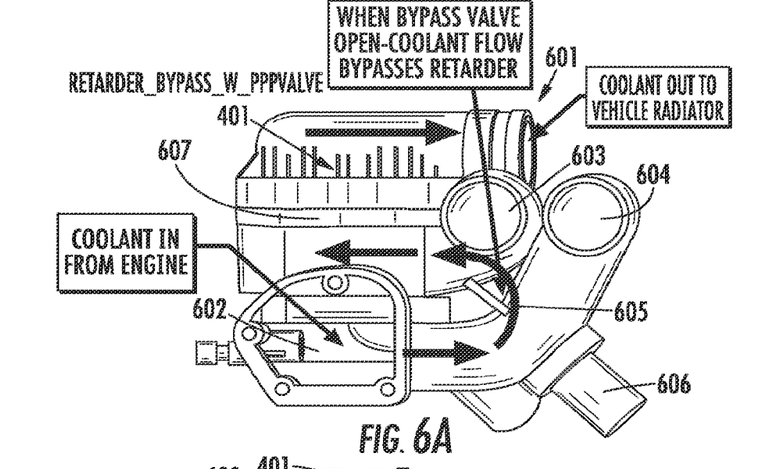
FIGS. 6A and 6B illustrate a coolant diverter having a pop-valve, in accordance with example embodiments.
Figure 6B:
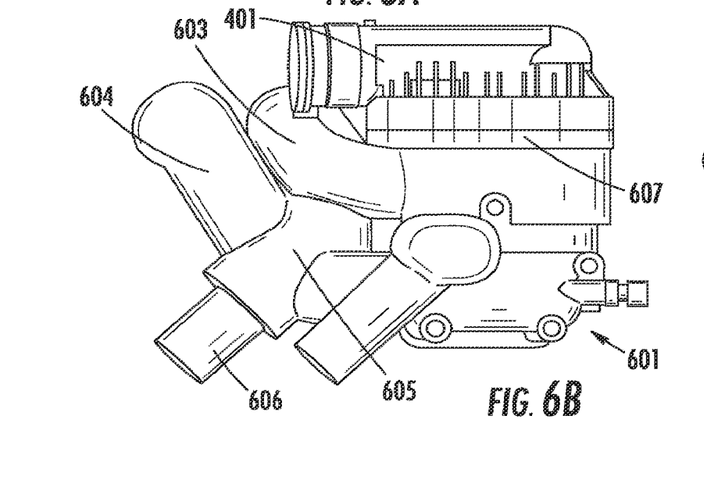

FIGS. 6A and 6B illustrate a coolant diverter having a pop-valve in accordance with example embodiments. Pop valve 606 is positioned in bypass passage 605 of the coolant diverter body 601 to control the fluid communication from the coolant inlet opening 602 to driveline retarder outlet opening 604 and bypass passage 605. The coolant inlet opening 602 receives coolant from the engine. The diverter body 601 includes coolant outlet openings 607 for sending coolant from bypass passage 605 or driveline retarder inlet opening 603 to a radiator via the radiator connector 401 coupled to the coolant outlet openings 607. When the pop valve 606 is configured in the open configuration coolant entering the coolant diverter body 601 can selectively flow to a driveline retarder via driveline retarder outlet opening 604 or passively bypass the driveline retarder via bypass passage 605. When the pop valve 606 is configured in the closed configuration all of the coolant entering the coolant diverter body 601 flows to the driveline retarder via driveline retarder outlet opening 604. The coolant supplied to the driveline retarder via driveline retarder outlet opening 604 returns to the coolant diverter body 601 via driveline retarder inlet opening 603 where it can flow to the radiator via coolant outlet openings 607 and radiator connector 401.

Figure 7A:
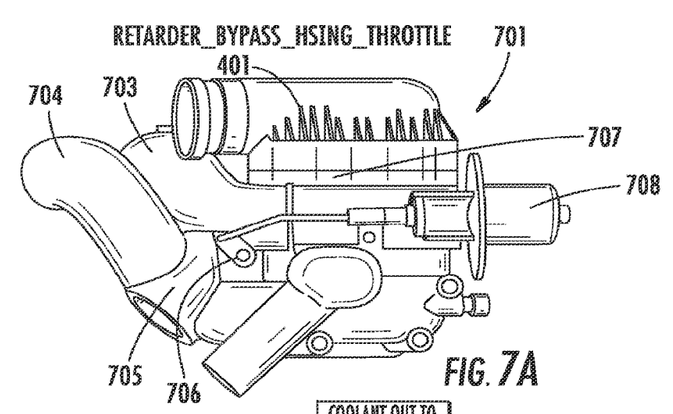
FIGS. 7A and 7B illustrate a coolant diverter having a throttle valve, in accordance with example embodiments.
Figure 7B:
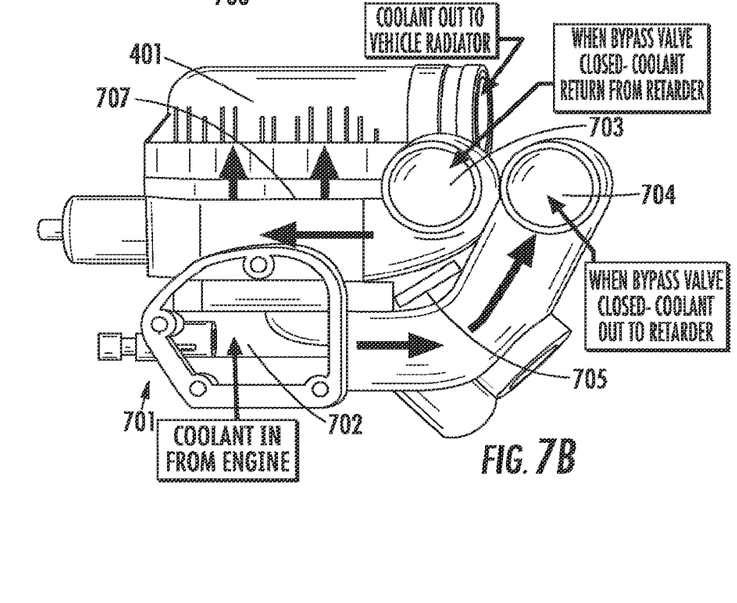

FIGS. 7A and 7B illustrate a coolant diverter having a throttle valve in accordance with example embodiments. Throttle valve 706 is positioned in bypass passage 705 of the coolant diverter body 701. Throttle valve 706 is actuated between closed and open orientations via valve actuator 708. Throttle valve 706 controls the fluid communication from the coolant inlet opening 702 to driveline retarder outlet opening 704 and bypass passage 705. The coolant inlet opening 702 receives coolant from the engine. The diverter body 701 also includes a coolant outlet opening 707 for sending coolant from bypass passage 705 or driveline retarder inlet opening 703 to a radiator via a radiator connector 401 coupled to the coolant outlet openings 707. When the throttle valve 706 is configured in the open configuration coolant entering the coolant diverter body 701 can selectively flow to a driveline retarder via driveline retarder outlet opening 704 or passively bypass the driveline retarder via bypass passage 705. When the throttle valve 706 is configured in the closed configuration all of the coolant entering the coolant diverter body 701 flows to the driveline retarder via driveline retarder outlet opening 704. The coolant supplied to the driveline retarder via driveline retarder outlet opening 704 returns to the coolant diverter body 701 via driveline retarder inlet opening 703 where it can flow to the radiator via coolant outlet openings 707 and radiator connector 401.

Figure 8:
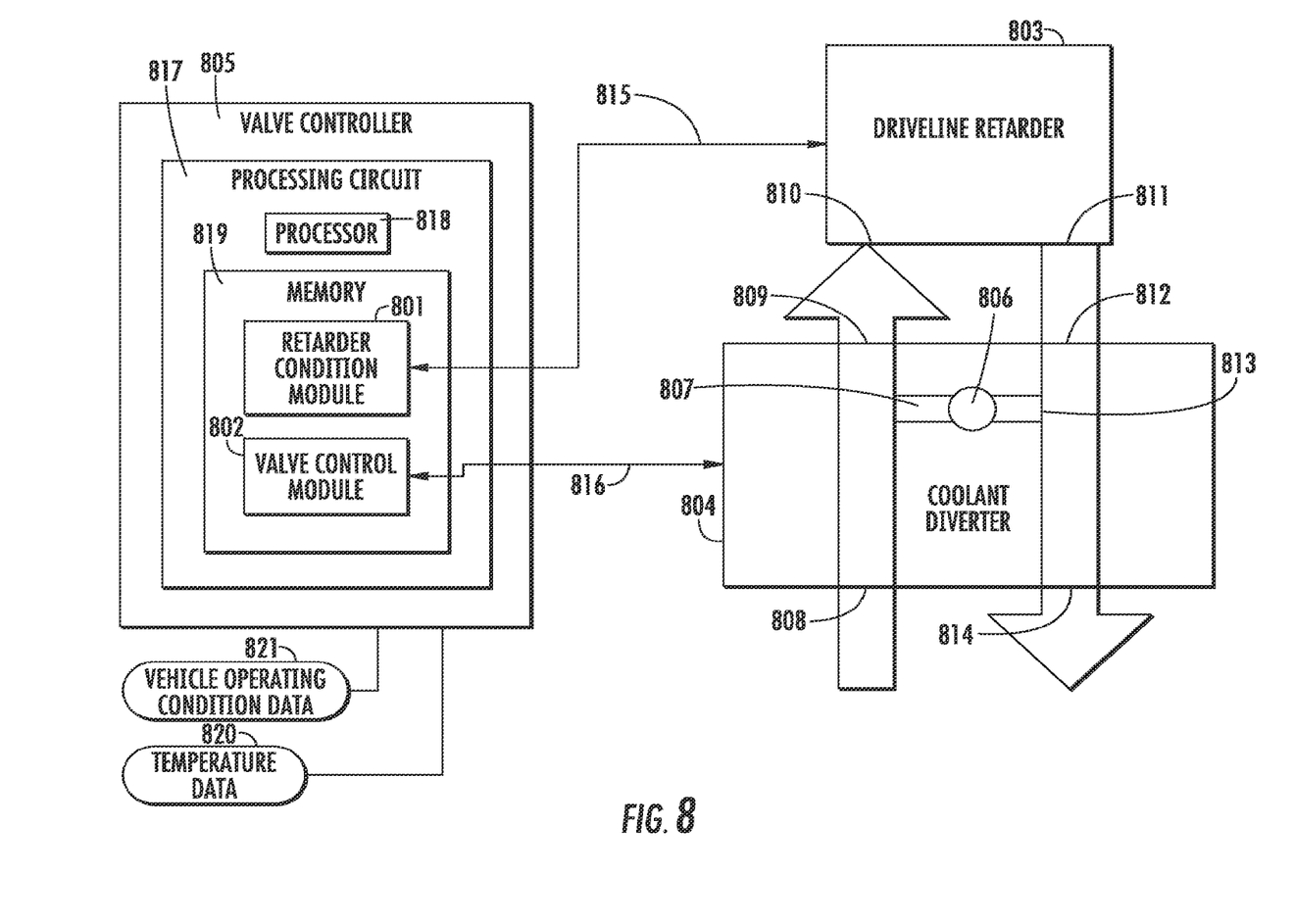
FIG. 8 illustrates a schematic of a valve control system coupled to a coolant diverter, in accordance with example embodiments.

FIG. 8 illustrates a schematic of a valve control system coupled to a coolant diverter in accordance with example embodiments. The valve controller 805 is shown to include a processing circuit 817 including a processor 818 and a memory 819. The processor 818 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 819 (e.g., RAM, ROM, Flash Memory, hard disk storage, etc.) may store data and/or computer code for facilitating the various processes described herein. Thus, the one or more memory devices 819 may be communicably connected to the processor 818 and provide computer code or instructions to the processor 818 for executing the processes described in regard to the valve controller 805 herein. Moreover, the one or more memory devices 819 may be or include tangible, non-transient volatile memory or non-volatile memory. Accordingly, the one or more memory devices 819 may include database components, object code components, script components, or any other type of information structure for supporting the various activities and information structures described herein.

Certain operations of the valve controller 805 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The memory is shown to include various modules for completing the activities described herein. More particularly, the valve controller 805 includes one or more modules structured to functionally execute the operations of the controller. As shown in FIG. 8, the controller 805 may include one or more condition modules, shown as condition module 801, that are structured to determine a condition of the driveline retarder and a valve control module 802.

The retarder condition module 801 is structured to receive data indicative of various operating conditions of the vehicle and/or the engine system including the cooling circuit. As described herein below, responsive to this data, the valve control module 802 may selectively control the coolant diverter 804 such as valve 806. The data may include, but is not limited to, vehicle operating condition data 821 and temperature data 820. The temperature data 820 may be indicative of a temperature of the driveline retarder 803 (e.g., the driveline retarder itself, the fluid in the heat exchanger in heat exchanging relationship with the driveline retarder, etc.). The temperature data 820 may be provided via one or more temperature sensors coupled to the driveline retarder 803 (or heat exchanger coupled to driveline retarder 803) and/or determined via one or more formulas, algorithms, processes, and the like based on other operating data. In this regard, the one or more condition modules 801 may be electrically coupled to the driveline retarder 803 via transmission pathway 815 for one or two-way communication.

The vehicle operating condition data 821 provides an indication of the operation conditions of the vehicle. The vehicle operating condition data 821 may include, but is not limited to, an indication of a braking event, a vehicle speed and changes thereto (e.g., rapid increases or decreases), an engine speed, an indication of a gear shifting event, and any other piece of data indicative of the operating conditions of the vehicle. Similar to the temperature data 820, the vehicle operating condition data 821 can be provided via one or more sensors and/or determined via various look-up tables, models, formulas, processes, and/or algorithms. Responsive to at least one of the temperature data 820 and the vehicle operating condition data 821, the one or more conditions module 801 is structured to determine whether or not the driveline retarder 803 is active. Thus, the vehicle operating condition data 821 and the temperature data 820 provide an indication of whether the driveline retarder 803 is active. For example, if the vehicle operating condition data 821 is indicative of a braking event occurring (e.g., a brake pedal of the vehicle is depressed for more than a nominal amount of time such as greater than one second, etc.), the one or more conditions module 801 may generate or determine a retarder condition that the driveline retarder 803 is active or, analogously, in an activated state. In an analogous manner, if the vehicle operating condition data 821 is indicative a braking event not occurring, then the one or more conditions module 801 may determine that the driveline retarder 803 is not active or, analogously, in a deactivated state.

In another example, if the temperature data 820 indicates that the temperature of the driveline retarder 803 is at or below a predefined temperature threshold, then the one or more conditions module 801 may determine that the driveline retarder 803 is active. A temperature below the predefined temperature threshold indicates that coolant is flowing through the heat exchanger to dissipate heat from the driveline retarder 803 (hence, the driveline retarder 803 is active). Of course, the demarcation of the temperature threshold indicative of an active driveline retarder is highly configurable based on the application with all such demarcations intended to fall within the spirit and scope of the present disclosure. As briefly mentioned above, the one or more retarder condition modules 801 may be structured to generate a retarder condition command (e.g., instruction, signal, value, output, etc.), which may be sensed by or transmitted to the valve control module 802, which may be communicatively coupled to the at least one retarder condition module 801.

Responsive to the determined retarder condition, the valve control module 802 is structured to cause transmission of a valve control command (e.g., signal, instruction, output, value, etc.) to valve 806 of coolant diverter 804. The valve control module 802 may transmit the valve control command to valve 806 via transmission pathway 816, which may include one or two-way communication. The valve control command causes the valve 806 to move between various orientations including a first closed orientation. In the first closed orientation, valve 806 causes substantially all of the coolant entering the coolant diverter 804 via coolant inlet opening 808 to flow to the driveline retarder 803 via the driveline retarder outlet opening 809 and isolates or prevents coolant entering the coolant diverter 804 via coolant inlet opening 808 from flowing through the bypass passage 807 and out of bypass passage outlet 813. When the valve 806 is in the first closed orientation coolant directed to the driveline retarder 803 via the driveline retarder outlet opening 809 returns to the radiator after flowing through the driveline retarder heat exchanger. Coolant enters the driveline retarder heat exchanger via inlet 810 and leaves the driveline retarder heat exchanger via outlet 811. The coolant flows from the driveline retarder heat exchanger and back to the radiator via driveline retarder inlet opening 812 in fluid communication with the coolant outlet opening 814. In the first open orientation, valve 806 permits the bypass passage outlet opening 813 and the driveline retarder outlet opening 809 to be in fluid communication with the coolant inlet opening 808. Accordingly, in the first open orientation, valve 806 permits passive flow direction to driveline retarder 803 or bypassed by the driveline retarder 803.

According to one embodiment, the valve control module 802 is structured to place the valve 806 in the first open valve orientation responsive to a determined deactivated driveline retarder 803. Responsive to a determined activated driveline retarder, the valve control module 802 is structured to place the valve 806 into the first closed valve orientation. These two configurations indicate that coolant is directed to the driveline retarder when the driveline retarder is active and the coolant substantially bypasses the driveline retarder when the driveline retarder is not active. In another configuration, the valve control module 802 is structured to place the valve in the first open valve orientation in response to deactivation of the driveline retarder and/or in response to a temperature in the driveline retarder being below a predetermined threshold. When the temperature is below the threshold, the driveline retarder 803 is at or below an intended temperature operating range such that additional coolant is unnecessary and would substantially only cause inefficiencies in the system. In still another configuration and in an analogous manner, the valve control module 802 is structured to place the valve in the first closed orientation responsive to an indication that the temperature of the driveline retarder is above the predefined threshold. Operation of the valve 806 in the above-described manner substantially optimizes cooling of the driveline retarder 803 to reduce inefficiencies caused by constant cooling.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 9.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Figure 9:
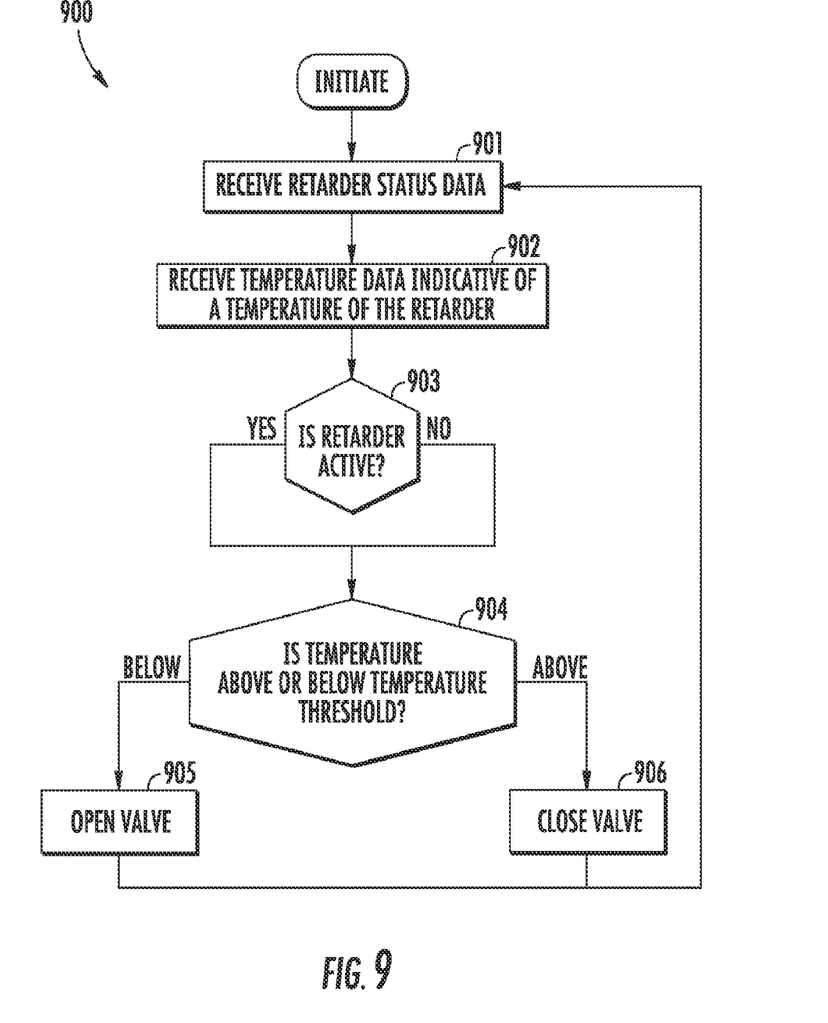
FIG. 9 illustrates a flow diagram for a valve control system operable to actuate a valve in a coolant diverter, in accordance with example embodiments.

Referring now to FIG. 9, a flow diagram for a valve control system operable to actuate a valve in a coolant diverter is illustrated in accordance with example embodiments. FIG. 9 illustrates the process implemented by the valve controller 805. At process 901, retarder status data is received. The retarder status data provides an indication of whether the driveline retarder is active or not active. Accordingly, the retarder status data may include, but is not limited to, data directly from the retarder that indicates whether the retarder is active and/or data that indirectly indicates whether the retarder is active or not. For example, indirect-type data may include whether a braking event is occurring (which would trigger activation of the retarder) and the like. At processes 902-903, operation data regarding the driveline retarder is received. More particularly, at process 902, temperature data is received by the valve controller 805, where the temperature data is indicative of a temperature of the driveline retarder (e.g., temperature data 820). Furthermore, at process 903, the valve controller 805 determines whether the retarder is active or not responsive to the data from process 901. At process 904, the valve controller 805 determines whether the temperature of the driveline retarder is above or below a temperature threshold based on the temperature data. As shown in this embodiment, process 904 is utilized whether process 903 indicates the driveline retarder is active or not active. Advantageously, this additional decision-logic (i.e., process 904) enables the prevention or substantial prevention of overcooling of the driveline retarder that may otherwise occur based on quick transient events (e.g., a quick braking event). In this regard, this additional decision-logic functions to optimize the efficiency of the cooling system.

If the valve controller 805 determines that the temperature of the driveline retarder is below the temperature threshold, the valve controller 805 opens the valve (e.g., valve 806). Opening the valve permits coolant to use the bypass passage, such that additional cooling of the driveline retarder is substantially prevented or reduced. If the valve controller 805 determines that the temperature of the driveline retarder is above the temperature threshold, the valve controller 805 closes the valve 806. Closing of the valve prevents or substantially prevents coolant from utilizing the bypass passage to thereby direct all or mostly all of the coolant entering the diverter body to the driveline retarder for cooling. As shown, the method 900 may be run continuously such that when the temperature indicates that the driveline retarder is at or below the threshold, coolant may be substantially prevented from going to the retarder via the opening of the valve 806. As such, in one embodiment, the cooling of the driveline retarder is substantially only indirectly related to operation of the vehicle.

The temperature threshold may be a user-defined threshold or any other threshold that indicates sufficient cooling. Because driveline retarder structures may vary, sufficient cooling thresholds may also vary such that the sufficient cooling threshold designation may be highly configurable. In one embodiment, sufficient cooling may be indicative of a fluid temperature limit for at least one of the coolant and an oil (e.g., hydraulic fluid, engine oil, etc.) in the engine system. In this regard, the temperature data may also be indicative of the temperature of at least one of the coolant and the oil in the engine system. The valve controller 805 may perform a comparison of the determined temperature to a temperature limit for the coolant and/or oil to determine whether to open, partially open, or close the valve 806 based on that determination. For example, if the coolant or oil temperatures are at or near (e.g., within a predefined amount, etc.) a high temperature limit or range for the coolant or oil (e.g., where the coolant or oil breaks down and may not effectively remove heat, etc.), the valve controller 805 may open the valve 806 in order to direct the coolant back to the radiator as quickly as possible to cool the coolant down. In another embodiment, if the temperature of the retarder is above a predefined threshold and the temperature of the coolant (or oil) is at, near, or above a high temperature limit, the valve controller 805 may partially open the valve 806 (e.g., fifty-percent, forty-percent, etc.) such that about half (or another percentage of) the coolant is directed to the radiator for cooling and the remaining portion is directed to the retarder for cooling the retarder. Of course, this functionality may be user defined: for example, the retarder temperature may trump the coolant or oil temperature, such that if the retarder is at, near, or above the temperature threshold, the controller 805 closes the valve 806 to direct all or mostly all the coolant to the retarder regardless of the coolant or oil temperature. Thus, coolant temperature or oil temperature may be used by the controller 805 to provide additional control options for the valve 806.

While "temperature threshold" is used above in regard to triggering the opening, partial opening, or closing of the valve 806, it should be understood that "temperature threshold" may encompass a variety of interpretations for either opening, partially opening, or closing the valve 806. For example, in one embodiment, the temperature threshold is simply an absolute numeric value (or an absolute numeric value with associated tolerance bands). In another embodiment, the threshold may include gradations, where each temperature within a gradation range triggers an action (e.g., if above a first threshold, close the valve by twenty-five percent, if above a second threshold (higher than the first threshold), close the valve by another twenty-percent, etc.). In still another embodiment, the threshold may be based on the time differential of the temperature data. In this regard, the valve controller 805 actively uses the time-rate of change of the temperature data to determine, predict, estimate, etc. when the valve 806 should open, partially open, or close. Accordingly, the valve controller 805 may utilize a rate-of-change threshold, such that if the determined time-rate of change exceeds that rate (in regard to an increase in temperature), the valve controller 805 moves the valve 806 to a closed position. In still another example, the valve controller 805 may utilize a temperature hysteresis estimate to determine whether to actuate the valve 806 to an open, partially open, or closed position. For example, while knowing the temperature that is indicative of the driveline retarder may be useful in some embodiments, in other embodiments, knowledge of whether the temperature is increasing or decreasing is useful, which is based on a past history of the temperature data (this combination represents the hysteresis of the temperature data). Thus, if the temperature data indicates the temperature is above a threshold, but the hysteresis shows that the temperature is decreasing at a rate that within a calibratable amount of time that would cause the driveline retarder temperature to be below the threshold, the valve controller 805 may at least partially open the valve 806 because the temperature momentum that is causing the rate of change decrease is sufficient momentum to reduce the temperature to at or below the threshold. Of course, any of these processes may be used alone or in combination with other processes.

With the above description, the following represent optional embodiments and configurations for the valve controller 805. All such variations described above and below may be used independently or in combination with one another. In a first embodiment, the valve controller 805 may close the valve when braking begins (such that coolant is directed to the retarder), keep the valve closed while braking is occurring, check the temperature of the driveline retarder for sufficient cooling, and open the valve when the retarder is sufficiently cooled. In a second embodiment, the valve controller 805 may close the valve when the temperature data indicates that the retarder temperature is not sufficiently cooled and open the valve 806 when the temperature data indicates that the retarder is sufficiently cooled. In a third embodiment, the valve controller 805 may close the valve 806 when braking begins and/or when the temperature data indicates that the retarder is not sufficiently cooled, keep the valve closed during braking, check the temperature data for sufficient cooling relative to a temperature threshold, and open the valve when the retarder is sufficiently cooled. The third embodiment may correspond with the most conservative approach in that the driveline retarder is being monitored via two avenues: the temperature of the driveline retarder and whether braking is occurring. The second embodiment may correspond with a fuel efficient approach in that cooling is only or substantially only being done on an as-needed basis. The third embodiment may correspond with an active configuration where the retarder is intended to be cooled during its active states.

Thus, the valve controller 805 may use braking completely, temperature completely, or a combination of both to open, partially open, or close the valve 806. In this regard, "temperature" may refer to at least one of the driveline retarder, the coolant (at prescribed or user-defined locations), and the oil (at prescribed or user-defined locations) in an engine system. Further, the temperature may be based on a temperature threshold, which as mentioned above, may include but is not limited to an absolute temperature threshold, a time-differential temperature threshold, a temperature hysteresis component, and/or some combination therewith.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A coolant diverter system comprising:
  a coolant diverter body comprising a housing, the housing comprising:
    a coolant inlet opening,
    a driveline retarder outlet opening in fluid communication with the coolant inlet opening,
    a driveline retarder inlet opening in fluid communication with the driveline retarder outlet opening, the driveline retarder outlet opening and the driveline retarder inlet opening configured to be in fluid communication with a driveline retarder,
    a coolant outlet opening in fluid communication with the driveline retarder inlet opening, and
    a bypass passage fluidly coupling the coolant inlet opening and the coolant outlet opening, the bypass passage comprising:
      a bypass passage inlet in fluid receiving communication with the coolant inlet opening, the bypass passage inlet positioned between the coolant inlet opening and the driveline retarder outlet opening, and
      a bypass passage outlet in fluid providing communication with the coolant outlet opening, the bypass passage outlet positioned between the driveline retarder inlet opening and the coolant outlet opening;
  one or more thermostat valves positioned in the housing and configured to control the flow of coolant through the coolant outlet opening;
  a valve positioned in the housing,
    the valve configured in a first valve orientation to fluidly couple the coolant inlet opening to the driveline retarder outlet opening in isolation from the bypass passage,
    the valve configured in a second valve orientation to fluidly couple the coolant inlet opening to the driveline retarder outlet opening and the bypass passage, the driveline retarder remaining operational to provide braking when the valve is configured in the second valve orientation; and
  a valve controller configured to receive operation data regarding the driveline retarder, the operation data indicating a braking event and a temperature of the driveline retarder being below a predetermined temperature threshold, the valve controller configured to place the valve in the second valve orientation in response to the braking event and the temperature of the driveline retarder being below a predetermined temperature threshold.

2. The coolant diverter system of claim 1, wherein the valve controller is configured to place the valve in the first valve orientation responsive to the operation data indicating the temperature of the driveline retarder being at or above a predetermined temperature threshold.

3. The coolant diverter system of claim 2, wherein the predetermined temperature threshold includes a predefined acceptable time differential rate of change of the temperature of the driveline retarder over a predefined amount of time.

4. The coolant diverter system of claim 2, wherein the predetermined temperature threshold is a value.

5. The coolant diverter system of claim 2, wherein the predetermined temperature threshold is based on a hysteresis of the temperature of the driveline retarder.

6. The coolant diverter system of claim 1, wherein the valve controller is configured to selectively place the valve in one of the first and second valve orientations responsive to temperature data regarding a coolant used in the coolant diverter system.

7. The coolant diverter system of claim 1, wherein the valve includes at least one of a pop-valve and a throttle-valve.

8. The coolant diverter system of claim 1, wherein the valve is configured to, in a third valve orientation, to fluidly couple the coolant inlet opening to the bypass passage in isolation from the driveline retarder outlet opening.

9. The coolant diverter system of claim 1, wherein the coolant diverter body further includes a radiator bypass circuit.

10. The coolant diverter system of claim 1, further comprising:
  a driveline retarder condition module configured to generate an activation signal in response to activation of the driveline retarder and in response to operation data indicating the temperature of the driveline retarder being at or above a predetermined temperature threshold; and
  a valve control module coupled to the driveline retarder condition module, the valve control module configured to:
    generate a first valve control signal in response to receipt of the activation signal, the first valve control signal configured to cause the valve to move to the first valve orientation,
    the valve moving to the first valve orientation from the second valve orientation.

11. The valve control system of claim 10, wherein the valve includes at least one of a pop-valve and a throttle-valve.

12. The valve control system of claim 10, wherein the valve is configured to in a third valve orientation fluidly couple the coolant inlet opening to the bypass passage in isolation from the driveline retarder outlet opening.

13. An engine system comprising the coolant diverter system of claim 1, the engine system further comprising:
  an internal combustion engine including a driveline component, the driveline retarder coupled to the driveline component for applying braking force to the driveline component;
  a coolant circulation system coupled to the internal combustion engine and fluidly coupled to the housing of the coolant diverter body;
  a driveline retarder supply channel coupling the driveline retarder to the driveline retarder outlet opening in the housing, the driveline retarder supply channel including a first vent;
  a driveline retarder return channel coupling the driveline retarder to the driveline retarder inlet opening in the housing, the driveline retarder return channel including a second vent; and
  a vent bypass channel coupling the first vent to the second vent.

14. The coolant diverter system of claim 1, further comprising:
  a driveline retarder condition module structured to determine that a driveline retarder in a vehicle is in one of an activated state or a deactivated state responsive to at least one of the temperature data and received vehicle operation data, the vehicle operation data indicative of an operating condition of the vehicle; and
  a valve control module coupled to the driveline retarder condition module, the valve control module structured to generate one of a first valve control command and a second valve control command responsive to a determined state of the driveline retarder;
  wherein the first valve control command is generated in response to the determined activated state, and wherein the first valve control command is configured to cause the valve to move to the first valve orientation;
  wherein the second valve control command is generated in response to the determined deactivated state, and wherein the second valve command is configured to cause the valve to move to the second valve orientation.

15. The valve control system of claim 14, wherein the valve includes at least one of a pop-valve and a throttle-valve.

16. The valve control system of claim 14, wherein the valve is configured to, in a third valve orientation, fluidly couple the coolant inlet opening to the bypass passage in isolation from the driveline retarder outlet opening.

17. A method of controlling coolant flow to a driveline retarder, the method comprising:
  receiving operation data regarding a driveline retarder, the operation data indicating a braking event and a temperature of the driveline retarder being below a predetermined temperature threshold; and
  causing a valve positioned in a housing of a coolant diverter body of a coolant diverter system to move from a first valve orientation to a second valve orientation in response to the braking event and the temperature of the driveline retarder being below a predetermined threshold, the first valve configuration fluidly coupling a coolant inlet opening in the housing to a driveline retarder outlet opening in the housing in isolation from a bypass passage, the second valve orientation fluidly coupling the coolant inlet opening to the driveline retarder outlet opening and the bypass passage in the housing, the driveline retarder remaining operational to provide braking when the valve is configured in the second valve orientation, the driveline retarder outlet opening in fluid communication with a driveline retarder inlet opening, one or more thermostat valves positioned in the housing and configured to control the flow of coolant through the coolant outlet opening,
  wherein the bypass passage comprises:
    a bypass passage inlet in fluid receiving communication with the coolant inlet opening, the bypass passage inlet positioned between the coolant inlet opening and the driveline retarder outlet opening, and a bypass passage outlet in fluid providing communication with the coolant outlet opening, the bypass passage outlet positioned between the driveline retarder inlet opening and the coolant outlet opening.

18. The method of controlling coolant flow to a driveline retarder of claim 17, further comprising causing the valve to move to a third valve orientation fluidly couple the coolant inlet opening to the bypass passage in isolation from the driveline retarder outlet opening.

19. The method of controlling coolant flow to a driveline retarder of claim 17, further comprising causing the valve to move to the first orientation in response to the operation data indicating the temperature in the driveline retarder coupled to the driveline retarder outlet opening being above a predetermined threshold.

20. The method of controlling coolant flow to a driveline retarder of claim 17, further comprising causing the valve to move to one of the first and second orientations responsive to temperature data regarding at least one of a coolant and an oil used in an engine system with the driveline retarder.

21. An engine system comprising:
 an internal combustion engine including a driveline component;
 a driveline retarder coupled to the driveline component for applying braking force to the driveline component;
 a coolant circulation system coupled to the internal combustion engine;
 a coolant diverter body comprising a housing fluidly coupling the coolant circulation system to the driveline retarder, the housing comprising:
  a coolant inlet opening in fluid communication with the coolant circulation system,
  a driveline retarder outlet opening in fluid communication with the coolant inlet opening,
  a driveline retarder inlet opening in fluid communication with the driveline retarder outlet opening,
  a coolant outlet opening in fluid communication with the driveline retarder inlet opening, and
  a bypass passage fluidly coupling the coolant inlet opening and the coolant outlet opening, the bypass passage comprising:
   a bypass passage inlet in fluid receiving communication with the coolant inlet opening, the bypass passage inlet positioned between the coolant inlet opening and the driveline retarder outlet opening, and
   a bypass passage outlet in fluid providing communication with the coolant outlet opening, the bypass passage outlet positioned between the driveline retarder inlet opening and the coolant outlet opening;
 one or more thermostat valves positioned in the housing and configured to control the flow of coolant through the coolant outlet opening;
 a valve positioned in the housing, the valve configured in a first valve orientation to fluidly isolate the bypass passage from the coolant inlet opening, the valve further configured in a second valve orientation to fluidly couple the coolant inlet opening to the driveline retarder outlet opening and the bypass passage, the driveline retarder remaining operational to provide braking when the valve is configured in the second valve orientation; and
 a valve controller configured to receive operation data regarding the driveline retarder, the operation data indicating a braking event and a temperature of the driveline retarder being below a predetermined temperature threshold, the valve controller configured to move the valve from the first valve orientation to the second valve orientation in response to the braking event and the temperature of the driveline retarder being below the predetermined threshold.

22. The engine system of claim 21, wherein the valve includes at least one of a pop-valve and a throttle-valve.

23. The engine system of claim 21, wherein the valve is configured to in a third valve orientation fluidly couple the coolant inlet opening to the bypass passage in isolation from the driveline retarder outlet opening.

* * * * *